(12) United States Patent
Dönitz et al.

(10) Patent No.: US 8,657,044 B2
(45) Date of Patent: Feb. 25, 2014

(54) PNEUMATIC HYBRID INTERNAL COMBUSTION ENGINE ON THE BASIS OF FIXED CAMSHAFTS

(75) Inventors: Christian Dönitz, Markdorf (DE); Christopher Onder, Weisslingen (CH); Julian Vasile, Albeuve (CH); Lino Guzzella, Uster (CH); Pascal Higelin, St. Denis en Val (FR); Yann Chamaillard, Le Bardon (FR); Alain Charlet, Vienne en Val (FR)

(73) Assignee: ETH Zurich (CH)

( * ) Notice: Subject to any disclaimer, the term of this patent is extended or adjusted under 35 U.S.C. 154(b) by 715 days.

(21) Appl. No.: 12/679,169

(22) PCT Filed: Sep. 19, 2008

(86) PCT No.: PCT/EP2008/007908
§ 371 (c)(1),
(2), (4) Date: Oct. 20, 2010

(87) PCT Pub. No.: WO2009/036992
PCT Pub. Date: Mar. 26, 2009

(65) Prior Publication Data
US 2011/0023820 A1   Feb. 3, 2011

(30) Foreign Application Priority Data
Sep. 22, 2007   (EP) .................................. 07018673

(51) Int. Cl.
*B60K 1/00*   (2006.01)
(52) U.S. Cl.
USPC ....... 180/54.1; 180/165; 123/316; 123/90.15; 123/90.12; 903/905

(58) Field of Classification Search
USPC ............ 123/316–317, DIG. 13, 90.12–90.15, 123/90.22–90.23, 90, 12, 15; 180/54.1, 180/65.265, 165
See application file for complete search history.

(56) References Cited

U.S. PATENT DOCUMENTS

| 3,958,900 A | * | 5/1976 | Ueno | 417/237 |
| 5,529,549 A | * | 6/1996 | Moyer | 477/189 |

(Continued)

FOREIGN PATENT DOCUMENTS

| DE | 39 03 474 A1 | 9/1989 |
| DE | 103 24 988 A1 | 12/2004 |
| EP | 1 308 614 | 5/2003 |
| FR | 2 784 419 A | 4/2000 |
| FR | 2 836 181 | 8/2003 |

(Continued)

OTHER PUBLICATIONS

International Search Report dated Jan. 30, 2009, issued in corresponding international application No. PCT/EP2008/007908.

*Primary Examiner* — John Walters
*Assistant Examiner* — James Triggs
(74) *Attorney, Agent, or Firm* — Ostrolenk Faber LLP (57) ABSTRACT

The present disclosure relates to an pneumatic hybrid internal combustion engine with at least one combustion chamber composed of a cylinder in which a piston is arranged mechanically interconnected to a crank shaft via a piston rod. An inlet valve and an exhaust valve are both mechanically interconnected via a valve gear to the crank shaft. The engine further includes at least one charge valve which is actuated by a charge valve actuator in a fully variable manner such that the engine can be operated in a four stroke hybrid mode.

14 Claims, 2 Drawing Sheets

(56) References Cited

U.S. PATENT DOCUMENTS

| | | | |
|---|---|---|---|
| 5,862,790 A * | 1/1999 | Dai et al. | 123/316 |
| 6,223,846 B1 * | 5/2001 | Schechter | 180/165 |
| 7,231,998 B1 * | 6/2007 | Schechter | 180/165 |
| 7,370,630 B2 * | 5/2008 | Turner et al. | 123/299 |
| 2006/0052930 A1 | 3/2006 | Froloff et al. | |

FOREIGN PATENT DOCUMENTS

| | | |
|---|---|---|
| FR | 2 865 769 A | 8/2005 |
| JP | 60187331 | 12/1985 |
| JP | 2007237023 | 9/2007 |
| WO | WO 2004/106713 A1 | 12/2004 |
| WO | WO 2005/079418 | 9/2005 |

* cited by examiner

PNEUMATIC HYBRID INTERNAL COMBUSTION ENGINE ON THE BASIS OF
FIXED CAMSHAFTS

CROSS REFERENCE TO RELATED APPLICATIONS

The present application is a 35 U.S.C. §371 National Phase conversion of PCT/EP2008/007908, filed Sep. 19, 2008, which claims benefit of European Application No. 07018673.9, filed Sep. 22, 2007, the disclosure of which is incorporated herein by reference. The PCT International Application was published in the English language.

BACKGROUND

1. Field of the Disclosure

The present invention relates to an improved internal combustion engine which can be operated in a four-stroke pneumatic modes according to the preamble of annexed patent claims.

2. Related Art

A plethora of suggestions and patents have been made in more than 100 years development to increase the overall efficiency of internal combustion engines as e.g. used in vehicles.

A rather old general concept for increasing the efficiency of an engine driven vehicle is directed to the recuperation of vehicle brake energy otherwise lost in friction brakes. This can be done by using the engine as a compressor, storing the compressed air inside a pressure vessel. This then enables to use the compressed air for pneumatic propulsion of the engine, either in connection with a normal thermal mode, i.e. when burning fuel, or without burning fuel, the so-called pneumatic mode (or air motor mode). This configuration is achieved by connecting one or more combustion chambers (i.e. cylinders) by the means of variable actuated valves to the pressure vessel. A further advantage of such a system consists in the ability to pneumatically restart the engine after stop.

The pneumatic modes can be achieved using one engine revolution (2 strokes). However, for such an operation not only the valves for the pressure vessel need to be fully variable in their actuation but also the inlet and exhaust valves of the combustion engine must fulfil the same criteria. The fully variable valves result in a very expensive and not reliable construction which is far away from today's production facility and proved technology. Since for normal thermal operation, a high variability of intake and exhaust valves is not necessary, this solution is more complex than necessary.

U.S. Pat. No. 3,958,900 was filed in the name of Takahiro Ueno and published in 1976. The document describes a fully mechanical combined engine and air compressor apparatus, whereby an engine action and an air compression action are changed over to each other by changing valve timing of inlet and exhaust valves in a purely mechanical manner. To achieve the for the operation necessary flexibility in valve timing and valve control a very complex mechanism with three adjustable cam shafts is foreseen to control the opening of the valves. Based on the information available the engine has never been commercially successful.

WO04106713A1, assigned to Lotus Cars Limited, is directed to an internal combustion engine with a combustion chamber which is connected to a reservoir for storing compressed air. Electro hydraulic valves which control the gas flow are arranged between the chamber and the reservoir so that air pressurised in the chamber can be relayed to charge the reservoir and pressurised air can be delivered to the chamber to drive piston. The chamber is also used for combustion of fuel. The disclosure also relates to a valve mechanism for controlling the flow of pressurised air between the chamber and reservoir. The valve mechanism applies a balancing force to the gas flow control valve to cancel the force on the valve arising from the pressure applied to the back face of the valve. Not only the charge valve but also the inlet and exhaust valve are actuated in a electro hydraulic manner.

WO05079418 (also published under US2006/0052930), of Froloff et al., discloses a dynamically re-configurable multi-stroke internal combustion engine, comprised of programmable computer processor controlled engine components for decoupling the four classic strokes of an internal combustion engine and electronically managing engine cylinder components including such cylinder components as electronically controllable valves, fuel injection and air fuel mixture ignition, allowing additional engine cylinder unit component states and thus cylinder strokes to be independently altered or re-sequenced by computer control to provide alternate engine modes of operation. Alternate engine modes are facilitated by addition of a compressed air storage reservoir to receive compressed air generated by the cylinder. In a further mode compressed air is transferred to the cylinder units to increase engine power and efficiency or utility. The described devices have a very complex Sensor input and on-demand requirements drive control logic to manage engine strokes through control of individual cylinder component states.

U.S. Pat. No. 6,223,846 of Michael Schechter describes a method and a system for converting kinetic energy of a vehicle and part of energy supplied by its engine into energy of compressed air to be used to assist in vehicle propulsion later. A system of valves employing variable valve timing and valve deactivation is used to implement and control a two-way flow of compressed air between the engine and an air-reservoir where air-temperature control is maintained. During operation with compressed-air assist the engine operates both as an air-motor and as an internal combustion engine during each cycle in each cylinder. The engine can selectively and interchangeably operate either as a four-stroke or as a two-stroke internal combustion engine.

U.S. Pat. No. 7,231,998 of Michael Schechter is directed to a vehicle engine which has a system of valves that permits various engine cylinders to operate in different modes of operation. During braking, some of the engine cylinders receive atmospheric air, compress it, and transfer it to an intermediate air-container. Other cylinders receive compressed air from the intermediate air-container, further compress it, and transfer it to a high-pressure air-reservoir for storage. During acceleration, some of the engine cylinders receive compressed air from the high-pressure air-reservoir, expand it to a lower level of pressure, and transfer it to the intermediate air-container. Other cylinders receive air from the intermediate air-container, further expand it, and use it for combustion in an internal-combustion cycle. During short stops, the engine is shut down, for the duration of the stop, and, then, it is restarted with compressed air. During cruise, the engine operates as a conventional internal-combustion engine.

FR2836181, assigned to Peugeot Citroen Automobiles SA, describes a combustion engine with several modes of operation. During deceleration and braking valves of one or more cylinders are controlled to make a cylinder work as a compressor delivering compressed gas to a gas reservoir through a flap valve and non return valve combination. The gas stored under pressure is returned to the engine through a plenum and operates to improve engine performance. The connections to the gas reservoir are arranged remotely to the cylinder which significantly reduces the efficiency.

EP1308614, assigned to Peugeot Citroen Automobiles SA, describes a power system which comprises an internal combustion engine with a gas inlet and an exhaust systems. A pressurised gas accumulator is linked to a control unit. The accumulator has an outlet connected through a valve to a turbo compressor which injects gas back into the engine. The intake of the gas accumulator is connected to the engine's exhaust system via a two-way valve connected to the accumulator and the main exhaust pipe, with a non-return valve between the two-way valve and accumulator. Also here all valves related to the charging of the reservoir are arranged outside of the engine cylinder.

U.S. Pat. No. 5,529,549 of David Moyer was published in 1999 and describes a method and an apparatus for improving the fuel economy and reducing emissions of an internal combustion engine by storing compressed air in a reservoir. A computer controls the energy conversion function of the engine by engine and distribution valves which are arranged outside of and remotely to the combustion chamber which results in a reduced efficiency and a limitation of the possible modes of operation. A supercharged engine function is possible by utilizing the compressed air stored in the reservoir.

FR2865769 assigned to the University of Orleans is directed to a process to operate an internal combustion engine in a pneumatic mode. The process involves injecting an additional quantity of air in a combustion chamber during compression phase of the normal cycle of the engine from an air-brake reservoir during the operation of a four-stroke internal combustion engine at low torque. The reservoir is connected to the chamber using a charge valve. The air is injected to obtain the desired engine torque instantaneously. Furthermore the combination of a pneumatic hybrid engine with a turbo compressor is described. The charge valve is actuated by a electromagnetic actuator. The described pump cycle (see FR2865769A1, page 10, line 6 ff) is a purely two stroke cycle with four phases. The described cycles are not of a four-stroke type because no exhaust stroke is present. The engine must therefore be equipped with variable actuators for the intake and exhaust valves such that it becomes possible to switch between two- and four-stroke mode (e.g. it would be necessary to switch-off the exhaust valve to perform the cycle as described). On page 11, line 1 to 5 a four stroke thermal undercharged mode is described.

DE3903474 assigned to AVL Gesellschaft für Verbrennungskraftmaschinenbau describes a method for operating an internal combustion engine in which gas is removed from each cylinder in a predetermined angular range of the crankshaft. The removed gas is fed to a temporary reservoir and is then fed back to the cylinder in another angular range of the crankshaft. The gas is removed from the cylinder after the end of combustion and is then being fed back from the temporary store before the beginning of compression. The target is to the achievement of a variable total charge mass in the combustion chamber while keeping the charge mass of fresh air the same. It is thereby possible to achieve a variable effective compression ratio.

The fuel efficiency of an internal combustion engine can be improved by the well known principle of downsizing the engine. A further approach is based on a combination of pneumatic hybridization with the well-known principle of down-sizing an internal combustion engine. To compensate the loss of power the engine is supercharged by a conventional turbocharger to maintain its peak power. This technology is well established amongst automobile manufacturers. However, one problem immanent to this technology is the so-called turbo-lag during transient engine operation.

One problem of common combustion engines is their low efficiency at part load conditions. To overcome this problem the operating point of the engine can be moved by auxiliary systems in the form of hybrid propulsion systems, e.g. in the form of electric hybrids or pneumatic hybrids. However, all of these attempts have a very complicated setup and therefore tend to be relatively expensive.

A further problem of combustion engines results from the high emissions during cold start. Especially gasoline engines produce a high percentage of their tailpipe emissions during cold start due to the fact that their three way catalytic converter is still cold and therefore cannot convert emissions like CO, NOx and HCs.

SUMMARY

It is an object of the invention to provide an improved, yet easy to operate and cost efficient solution for a hybrid propulsion system. Furthermore it is an object of the invention to provide an improved pneumatic propulsion system which can be adopted to standard four stroke combustion engines. Still a further object of the invention is to provide a novel approach to improve fuel economy of internal combustion engines.

The invention is directed to a pneumatic hybrid internal combustion engine having a simple and yet efficient setup. In difference to the systems known from prior art the present invention may avoid the complex setup inherent to the hybrid engines as presently available in that it is not necessary to switch between two- and four-stroke modes.

In one embodiment the pneumatic hybrid internal combustion engine comprises a first pressure vessel suitable to receive and store compressed air from a combustion chamber and a second pressure vessel suitable to receive and store compressed hot exhaust from a combustion cycle. The gas-exchange is controlled via a fast (variably) switching charge valve arranged close by or inside the combustion chamber interconnected to a slow switching valve which directs the gases to one of the pressure vessels or at least one fast switching charge valve per pressure vessel arranged close by or inside the combustion chamber. In that the at least one charge valve per combustion chamber is arranged closed-by or inside the combustion chamber the efficiency can be improved. Gases from several combustion chambers can be stored jointly in one joint pressure vessel which is interconnected to the combustion chamber via a collector conduit with several openings.

In general, vehicles and their combustion engines are normally exposed to different driving conditions, such as traction mode (the engine has to produce torque), braking mode (the engine is propelled by the wheels of the vehicle and can therefore retrieve energy), coasting mode (the engine does not have to produce or receive torque), standing still (the engine does not rotate) or acceleration mode (the driver commands a quick acceleration of the vehicle).

Subsequently different modes of operation of the engine are described which are related to the above driving conditions based on an example of a gasoline engine. However, the concept is also valid for Diesel engines. Depending on the field of application and the design of the engine the different operation modes can be used for all cylinders simultaneously or different cylinders can be operated in different modes, e.g. depending on the engine torque required and the states of the pressure tanks. The following operation modes can be used alone or in a combination thereof:

Conventional Thermal Mode: A fuel-air mixture is compressed and ignited to produce torque. The charge valve is closed.

Supercharged Thermal Mode: During the compression stroke, pressurized air stored in the first pressure tank (cold gas tank, resp. fresh air tank) is led into the cylinder via a charge valve before the cylinder pressure has reached the tank pressure. At equal pressures, the charge valve is closed. Thereby more fuel can be injected and a high torque can be produced. This mode can be used during transient high acceleration phases.

Exhaust Storing Thermal Mode: After or close to the end of the combustion, a charge valve is opened to lead burned gases into a second pressure tank (exhaust gas tank). The charge valve is normally closed before the cylinder pressure has dropped to the level of the exhaust gas tank pressure level.

Pneumatic Pump Mode (4-stroke): When the vehicle is in braking mode, the engine is propelled by the drive train. In this mode, air is aspirated in an intake stroke, compressed in the compression stroke, during compression a charge valve is opened and again closed near the top dead centre (when the cylinder has reached its highest position). Near the bottom dead center (when the cylinder has reached its lowest position), an exhaust valve opens and the exhaust stroke is carried out. When a switching valve is present in the exhaust track after the combustion chamber it is possible that during the exhaust stroke exhausted air is redirected towards the ambient bypassing the catalyst and thereby avoiding negative oxygen flooding. At low engine speeds, higher brake torque can be achieved by opening and closing the charge valve twice during the 180° degrees of the compression stroke.

Pneumatic Motor Mode (4-stroke): This mode is for the traction mode of the vehicle and also used for starting the engine from standstill. The engine aspires air in an intake stroke that can utilize the throttle as a means of load control. The air is compressed in an compression stroke. When the piston moves down again, exhausted gases stored in the exhaust gas tank are led into the cylinder via a charge valve. The charge valve opens when cylinder pressure is similar to the exhaust gas tank pressure, either in the compression stroke or in the subsequent expansion stroke. The throttle may be used to reduce the inlet pressure and thereby reduce the air mass at the lower dead centre at the end of the suction stroke. Depending on the operation temperature this may result to a higher torque and an improved efficiency. The charge valve is closed again according to the required load of the engine, before the exhaust valve opens and the exhaust stroke is carried out. Alternatively it is possible to use fresh air stored in the fresh air tank.

Undercharged mode: In this mode, the conventional thermal mode is modified by the use of the charge valve. A charge valve is opened during the compression of the air and compressed air is transferred to the fresh air tank. Still during the compression stroke the charge valve closes and an appropriate amount of fuel is injected and burned. This method requires a very late direct injection as e.g. used in Diesel engines. This mode is preferably performed unthrottled. This method is an operating mode to move the operating point of the engine.

In general the described operation modes can be combined on time-basis (all cylinders always in the same mode for a specified time interval) or cylinder basis (different modes are used at the same time by different cylinders).

Exhaust Storing Mode and Pneumatic Motor Mode: During low load situations, it may be efficient to carry out a so-called duty-cycling. The operating mode is switched between an exhaust storing mode and a pneumatic motor mode. The switching may be performed time-based or cylinder-based or a combination thereof. Thereby a higher overall efficiency results compared to conventional thermal mode use. However, it has been shown that the time-based duty-cycling is limited to specified areas of operation parameters. For cylinder-based switching it can be advantageous to provide individual throttling of the several cylinders.

Exhaust Storing Mode and Pneumatic Pump Mode: One or more cylinders perform the exhaust storing mode and some perform the pneumatic pump mode. Cylinder-based only.

De-throttled Conventional Thermal Mode and Pneumatic Pump Mode: Cylinder-based only.

When the inlet and the exhaust valves are also designed fully variable like the charge valve, the two purely pneumatic modes can be carried out in an engine having a first (cold) and a second (hot) pressure tank as 2-stroke modes. One disadvantage results from the much more complicated setup of the actuation of the inlet and exhaust valves and the significantly higher production costs. However such an engine would still benefit from the presence of a first and a second pressure tank as described above.

Cold Start Operation: In order to avoid high cold start tailpipe emissions of CO, NOx and HC, the cold engine start may be performed as follows. The start of the engine from zero speed is performed by the pneumatic motor mode by using fresh air from a first pressure tank. The air exhausting from the combustion chamber is directed towards the ambient. Then the engine is switched to exhaust gas storing thermal mode. Thereby at least part of the engine exhaust is stored in a second exhaust gas tank. Remaining exhaust gas is directed towards the (three-way) catalyst. During this phase, the catalyst may be heated to operation temperature not only by the exhaust gas, but also by external heating, e.g. electrical or fuel based. After the catalyst has reached its ideal operation temperature, the stored exhaust gases can be used to propel the vehicle. The after treatment of the so far untreated exhaust gases is then done efficiently by the warmed up three-way-catalyst. The described method of cold start may reduce tailpipe emissions for the cold start significantly. This is especially very important for gasoline engines, their only problem with emission are the emissions during cold start.

Engine Idling: In one embodiment of the invention engine idling is used to store by filling at least one pressure tank by cold air (split mode) and/or exhaust gas. This energy is then be retrieved when needed, e.g. during acceleration (supercharged mode) or start up of engine. When a pneumatic start is necessary soon, e.g. during stop and go traffic, the exhaust gas storing mode is suitable to restart the engine. When the supercharged mode is envisaged, fresh air is stored combining conventional mode and pneumatic pump mode.

The invention offers significant advantages in the technology of pneumatic hybrid engines. Beside the simplified setup an internal combustion engine according to the present invention offers low fuel consumption. Fuel savings of up to 30% are realistic compared to a conventional combustion engine having the same rated power. Depending on the embodiment this is achieved by the start/stop capability, recuperation of brake energy, downsizing of the engine and moving of operating point of the engine. Furthermore it is possible to significantly reduce emissions in that the engine is operated in stoichiometric operation. By a second switching vent it is avoided that air is directed towards the exhaust treatment system. Furthermore it is possible to improve driveability by using the supercharged mode in transient operation until the turbocharger reaches a high enough speed to supercharge the engine without the additional need of air from the pressure tank. One significant advantage is seen in the low cost design compared to other pneumatic or electric hybrids. A further advantage results from the only slight increase of the overall weight.

The following section lists the advantages of the presented system configuration over a known pneumatic hybrid system. In difference to the pneumatic hybrid engines known from the prior art which are based without exception on a two-stroke pneumatic mode, a four-stroke pneumatic mode offers significant advantages. In the pneumatic hybrid engines known from the prior art, the majority amount of the additional expenses result from the design and setup of the fully variable valve actuation which is required for all valves (inlet and exhaust valves). Otherwise the engine would not be operatable. A substantial amount of this extra cost can be reduced in that the inlet and exhaust valves have a common setup as known from normal combustion engines and only the charge valves have a fully variable setup. The efficiency of the 4-stroke pneumatic modes is only slightly lower (if at all when considering valve actuation energy necessary to actuate all valves with a fully variable system) compared to the known 2-stroke pneumatic modes. Also, the achievable torque (negative or positive) of the 4-stroke modes is sufficient for the envisaged application. In addition, for the pneumatic motor mode, the throttle valve can be used to increase the torque if necessary. For the pneumatic pump mode at low engine speeds, the charge valve can be opened and closed several times during the 180° of the compression stroke to further increase the brake torque.

In a conventional combustion engine, the conventional thermal mode is due to throttling losses not only low in part-load efficiency, but also due to the blow-off when the exhaust valves are opened and exhausted gases with high pressure and temperature are blown off through the exhaust. In difference to that when the engine has to deliver high power, these gases are used to accelerate the turbine of the turbocharger and the compressor of the turbocharger is efficiently used to compress air at the intake. When at part load only a limited amount of power is needed, the exhaust gas storing thermal cycle enables the so-called duty-cycling described above. The use of this duty-cycling further increases the overall efficiency of the system.

The inner energy of a gas is higher, the higher the temperature is. Using the pneumatic motor mode, a high internal energy of a gas also leads to more energy being available for propulsion and therefore decreases fuel consumption. The exhaust gas tank is normally insulated to keep the internal energy at a high level over a certain period of time. In contrast to that, the fresh air tank is normally cooled e.g. by airflow or a liquid cooling because the air is intended to be used preferably in the supercharged mode to boost the engine. When supercharging an engine with high torque, additional fuel is burned and the risk of destructive motor knocking has to be considered. One major reason why motor knocking occurs is the high temperature of the mixture in the internal combustion engine. Injecting cold air into the cylinder may reduce the risk of motor knocking. For the supercharged mode, only the mass of air additionally admitted is of interest, since a stoichiometric fuel/air ratio is envisaged.

To avoid flooding the catalyst of the after treatment system with oxygen during pneumatic motor mode, GB2402169 suggests exhausting the air towards the inlet. This requires fully variable valve actuation for inlet and exhaust valves and it requires therefore a very difficult setup. In the herein disclosed invention the problem can be solved using two means: The pneumatic motor mode is preferably performed using stoichiometric exhaust gas which can be treated by the catalyst. When performing the pneumatic pump mode or the pneumatic motor mode using fresh air, a remaining quantity of fresh air will still leave the exhaust. To avoid this, a switching valve can be foreseen located after the exhaust valve which redirects the escaping gas towards the ambient. A system for injecting the fuel directly into the cylinder is normally not necessary.

In an embodiment of the invention the problem is solved by a pneumatic hybrid propulsion system which comprises a standard internal combustion engine as widely distributed. The standard internal combustion engine normally comprises an engine block with a cylinder head and at least one moving piston to transfer energy gained from an exothermic chemical process of combustion via piston rod to a crankshaft. The air flow is here controlled by a common throttle valve arranged in the inlet area of a combustion chamber. To improve fuel economy the shown embodiment is equipped with a turbocharger by which ambient air is compressed before it is led via at least one inlet valve into the combustion chamber. The inlet valve is actuated by a simple mechanical camshaft drive as known from the prior art. In difference to solutions known from prior art the present invention does not require complicated fully variable intake and exhaust valve actuation. In the described embodiment the inlet valve and the outlet valve are driven by one common camshaft or two different camshafts (each one for inlet and exhaust valves) being rigidly interconnected to the crankshaft of the internal combustion engine. One common camshaft is in general more cost effective and offers more room for the arrangement of the charge valve. If appropriate it may be foreseen to change the timing of the inlet and exhaust valves. The inlet and exhaust valves are designed as standard poppet valves actuated in that the valve head is pressed against a spring load into the combustion chamber.

The engine further comprises a charge valve which is designed to be fully variable and independently activatable from the rigidly coupled inlet and exhaust valves by an electronic control means. In that the engine as such has a standardized setup and only the charge valve is designed as being fully variable it becomes possible to combine the described invention with almost any standard internal combustion engine available on the market without dramatic change to it. The charge valve interconnects the combustion chamber via a collector conduit and a first switching valve with a first and a second pressure tank. The first pressure chamber is designed to receive and store compressed air and the second pressure tank is designed to receive burned gases from a combustion chamber. While the first pressure tank may be cooled, e.g. by a water cooling or airflow the second pressure tank is insulated to avoid heat loss and to keep the content stored in the second tank above atmospheric temperature and pressure. The secondary switching valve is relatively slow compared to the charge valve which is capable to open and close if necessary several times per cycle, resp. engine revolution.

The exhaust valve is in the described embodiment mechanically driven by an in principle fixed camshaft which is interconnected to the engine crank shaft. The exhaust valve discharges burned gases or air to the outside of the combustion chamber. A second switching valve directs in a thermal mode gas escaping from the combustion chamber to a turbine of the turbocharger. The escaping gases are reduced in pressure and are directed towards an exhaust system to the outside. In a venting mode the second switching valve directs gas escaping from the combustion chamber directly to the outside by bypassing the turbine of the turbocharger. To simplify the setup it is possible avoid the second switching valve. However, the efficiency may thereby be reduced.

A further embodiment comprises instead of one charge valve and one first switching valve, two fully variable charge valves which interconnect the first and the second pressure tank individually to the combustion chamber via a first and a second conduit. Thereby it becomes possible to actuate the pressure tanks more flexibly.

In that the at least one charge valve is arranged directly adjacent or inside of the combustion chamber, the dead volume is reduced and the total efficiency is improved. Furthermore if a switch valve is present it should be arranged as close as possible to the charge valve to avoid large dead volume.

To improve the efficiency of the combustion engine an air cooler may be foreseen between the turbocharger and the combustion chamber to cool the air admitted.

Depending on the layout of the combustion engine, fuel can be injected in the inlet area or directly into the combustion chamber.

In a more simple embodiment no exhaust gas storage tank is present. Instead compressed air is stored in one or more tanks.

A pneumatic hybrid internal combustion engine according to the present invention normally comprises the following sensors (depending on the design and the field of application not all sensors are mandatory): An air mass flow, a temperature and a pressure sensor arranged in the intake manifold to determine the mass flow, the temperature and the pressure of the air provided to the combustion chamber, a crank angle speed sensor to determine the speed of the crank axle, a lambda sensor arranged in the exhaust system to measure the quantitative relationship of gases in the exhaust, a pressure and a temperature in each the pressure tank, a load demand sensor interconnected to the brake pedal and the gas pedal to determine the driver's request, a speed sensor to determine the speed of the vehicle, a pressure sensor to determine the pressure in the at least one combustion chamber, a lambda sensor and a pressure sensor in the at least one pressure tank, a temperature Sensor to determine the temperature in the exhaust system, resp. of the catalyst, a sensor for the at least one charge valve. The sensors normally are interconnected directly or indirectly to a control device to determine best operation conditions based on characteristic diagrams.

A pneumatic hybrid combustion engine according to the invention is normally equipped with or interconnected by the following actuators (depending on the type and the design of the engine not all actuators might be necessary): A throttle, an actuator for the at least one charge valve which determines the opening and the closing movement and the desired lift, an actuator for the spark ignition and the timing (gasoline engine), an actuator for the fuel injection (diesel and gasoline engine), an actuator to determine the amount and timing of fuel injection (can be zero), a switch valve to determine which pressure tank is interconnected, a switch valve to bypass the exhaust, a gas pedal and a brake pedal (driver), a bypass valve for the turbocharger (waste gate).

Figure 2:
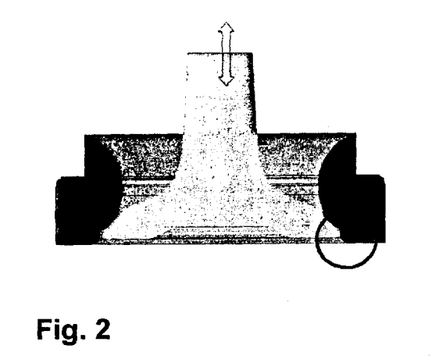
FIG. 2 a cross-sectional view of a valve.
Figure 3:
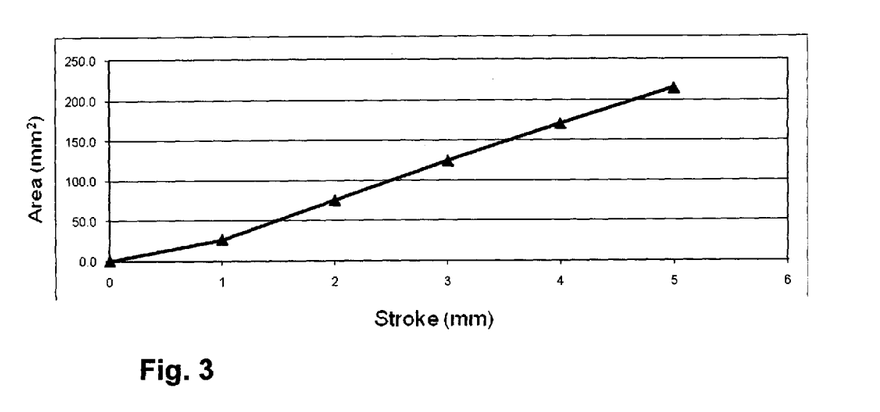
FIG. 3 a graph depicting a valve stroke.

Because one aspect of the present invention is directed to the use of an in general standardized combustion engine as base for the hybridization the at least one charge valve must fulfil certain conditions and requirements. On one hand the design and the actuation of the valve must be carried out such that no collision with the piston occurs. Good results are achieved in that the charge valve is designed as a poppet valve which allows to open a large cross-sectional area in a short time. Good results are achieved in that the poppet valve in a pneumatic hybrid combustion engine according to the present invention has a diameter in the range of 10 mm to 25 mm. It has been found that the at least one charge valve should be able to open or close in a time less or equal to 10 ms. Depending on the engine size and speed this value might be different. For the supercharged mode, a high actuation precision is needed. This can be achieved by opening the valve just a small distance. The valve seat (No. 23 in FIGS. 1 and 2) can be designed such that the cross-sectional area (FIG. 3) available for air flowing through is relatively small for the first millimeter of the opening (see FIGS. 2 and 3). For other pneumatic modes, always a high cross-sectional area for flow is preferable. Therefore, the charge valve (No. 18) is always opened further for these modes. In this way, a higher actuation precision can be reached for the supercharged mode. After the first mm, the flow area is higher (see. FIG. 3). It has been found that the conduit interconnecting the at least one pressure tank with the corresponding charge valve should have a cross-section which is bigger than $\frac{2}{3}$ of the cross section of the poppet charge valve.

The temperature level of the exhaust gas tank has to be kept below the melting temperature of the (steel) pressure vessel, but is otherwise kept high. The temperature level of the fresh air tank can vary depending on the use of the tank between ambient temperature and about 500° C.

The pressure tanks can be made out of different materials as long as isolation and/or cooling are guaranteed. The performance can be improved in that the first pressure tank to store compressed air at a low temperature is made out of a material which conducts heat very well (e.g. aluminium), such that good cooling results. The second pressure tank to store exhaust must be designed to withstand pressure at a high temperature level. Good results can be achieved in that the second tank is made out of steel. To avoid unwanted cool down of the content the second pressure tank may be isolated.

In an embodiment the at least one charge valve is based the commercially available Bosch EHVS System valve system which is directed to an electro hydraulic valve control system. Although these valves are not designed as charge valves in a pneumatic hybrid combustion engine but rather as inlet and exhaust valves for a common combustion engine, these valves have to be adopted in a certain manner to fulfil the requirements needed in an embodiment according to the present invention. In difference to normal application in a combustion engine they must be able to open and close more often during a combustion cycle then normally. In addition the activation system must be designed that it can hold external pressure without negative loss. This means that in difference to prior art the valves must be designed to not only withstand high internal pressure but also external pressure from the at least one pressure tank. Therefore the design of the actuation cylinder must be adopted accordingly.

BRIEF DESCRIPTION OF THE DRAWINGS

The herein described invention will be more fully understood from the detailed description given herein below and the accompanying drawings which should not be considered limiting to the invention described in the appended claims.

The drawings are showing.

DESCRIPTION OF THE EMBODIMENTS

Figure 1:
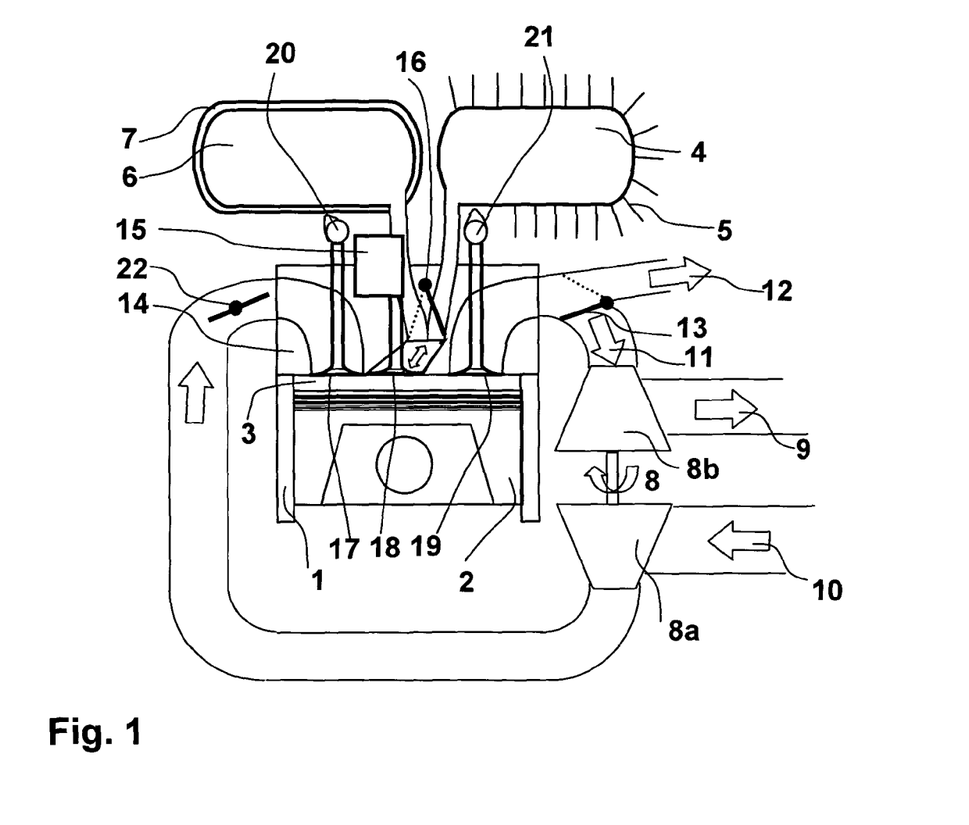
FIG. 1 a setup of a pneumatic hybrid combustion engine.

FIG. 1 schematically shows a configuration of a combustion engine according to the present invention. An engine block (cylinder) 1, a cylinder head 14 and a piston 2 are encompassing a combustion chamber 3 with a variable volume. Ambient air 10 is aspired from the environment and compressed by a compressor 8a of a turbocharger 8. In the shown embodiment the air flow is controlled by a throttle 22 arranged in the intake area of the engine and admitted into the combustion chamber 3 via an inlet valve 17, which is mechanically actuated by a camshaft 20. The camshaft 20 is mechanically interconnected and driven by an engine crankshaft (not shown in detail). A charge valve 18 which interconnects a first and a second pressure tank 4, 6 with the combustion chamber is actuated by a charge valve actuator 15 in fully variable manner. This means, that while the inlet and exhaust valves 17, 19 are mechanically interconnected to the crankshaft, the charge valve can be operated completely independent from the crankshaft. The charge valve actuator 15 consist in a preferred embodiment out of an electro hydraulic actuator having a piston arranged in a chamber which can be pressurized by a hydraulic fluid from two opposite sides. Thereby the charge valve interconnected to the piston of the electro hydraulic actuator can be opened and closed in a very fast and yet controlled manner. To avoid damage in a non-pressurized state the charge valve 18 may be held, e.g. by a spring load, in an upper position.

The charge valve actuator is controlled by an electronic control means (not shown in detail). In the shown embodiment the charge valve 18 admits air or burned gases (exhaust) in both directions to the pressure tanks 4, 6 via a switch valve 16. Depending on the status of the switch valve 16, either burned gases are stored in a hot condition in the second pressure tank 6 which is here provided with an insulation 7. Alternatively fresh air (with only little fraction of burned gases) is stored in the first pressure tank 4 at a lower temperature level. As it can be seen the first pressure tank 4 is equipped with heat exchange means 5 for cooling. The exhaust valve 19, which is also driven mechanically by a camshaft 21 interconnected to the crank shaft of the engine (not shown) admits burned gas or decompressed air to the outside of the combustion chamber. A further switch valve 13 may be foreseen to bypass the turbocharger 8 and/or a catalyst (not shown) and release the gas to the environment. During thermal mode burned gases 11 are directed by the switch valve 13 towards the turbine 8b of the turbocharger 8. The burned gases are there reduced in pressure and then directed towards an exhaust system (indicated by arrow 9) with or without an gas after treatment system.

In a further embodiment each of the pressure tanks 4, 6 is interconnected with an individual charge valve as described above with the combustion chamber. Depending on the field of application it is also possible to provide only one pressure chamber for hot and/or cold gas although the overall efficiency will be less.

What is claimed is:

1. Method for the operation of an internal combustion engine, said internal combustion engine comprising:
   at least one combustion chamber bordered by a cylinder, in which a piston is arranged mechanically interconnected to a crank shaft via a piston rod and a cylinder head with an inlet valve and an exhaust valve both mechanically interconnected via a valve gear to the crank shaft; and at least one charge valve which is actuated by a charge valve actuator in a fully variable manner such that the engine is operated in a four stroke pneumatic mode, wherein in a four-stroke pneumatic pump mode, the combustion engine is propelled by the drive train, the method comprising:
   a. aspirating air via an inlet valve during an intake stroke
   b. compressing air during the compression stroke, whereby during compression the charge valve is opened and again closed near the highest position of the cylinder transferring air to a pressure tank,
   c. expanding air in the cylinder during an expansion stroke, and exhausting air via an exhaust valve during an exhaust stroke.

2. Method for the operation of a combustion engine according to claim 1, further comprising:
   a. leading fresh air stored in a pressure tank into a cylinder during a compression stroke via a charge valve before the cylinder pressure has reached the pressure of the pressure tank, and
   b. closing the charge valve at equal pressures.

3. Method for the operation of a combustion engine according to claim 1, further comprising:
   a. aspirating air in an intake stroke, then
   b. compressing air in an compression stroke, then
   c. when the piston moves down again, exhausted gases stored in a second pressure tank are led into the cylinder via a charge valve, whereby the charge valve opens when the cylinder pressure is similar to the second pressure tank pressure, either in the compression stroke or in the subsequent expansion stroke.

4. Method for the operation of a combustion engine according to claim 1, further comprising:
   a. aspirating air in an intake stroke, then
   b. compressing a compression stroke, then
   c. when the piston moves down again, pressurized air stored in a first pressure tank is led into the cylinder via a charge valve, whereby the charge valve opens when the cylinder pressure is similar to the first pressure tank pressure, either in the compression stroke or in the subsequent expansion stroke.

5. Method for the operation of an internal combustion engine according to claim 3, wherein a throttle of the internal combustion engine is used to reduce the inlet pressure such that the air mass is reduced at the lower dead centre at the end of the suction stroke.

6. Method for the operation of an internal combustion engine according to claim 3, wherein the charge valve is closed according to the required load of the engine, before the exhaust valve opens and the exhaust stroke is carried out.

7. Method for the operation of an internal combustion engine according to claim 1, wherein the charge valve actuator is of an electro hydraulic type comprising a piston which is exposed to hydraulic pressure from two opposite sides.

8. Method for the operation of an internal combustion engine according to claim 1, wherein a first pressure tank is connected to the charge valve to store compressed air.

9. Method for the operation of an internal combustion engine according to claim 1, wherein a first pressure tank and a second pressure tank are present, whereby the first pressure tank is foreseen to store compressed air at a low temperature level and the second pressure tank is foreseen to store exhaust at a high temperature level.

10. Method for the operation of an internal combustion engine according to claim 9, wherein the first and the second pressure tank are interconnected to the at least one combustion chamber via a charge valve and a switching valve.

11. Method for the operation of an internal combustion engine according to claim 9, wherein the first and the second pressure tank are interconnected to the combustion chamber by separate charge valves.

12. Method for the operation of an internal combustion engine according to claim 9, wherein the first pressure tank is cooled or the second pressure tank is insulated.

13. Method for the operation of an internal combustion chamber according to claim 1, wherein the engine is equipped by a turbocharger to compress the air in an intake area by energy retrieved from the exhaust.

14. Method for the operation of an internal combustion engine according to claim 13, wherein a bypass valve is arranged between the exhaust valve and a catalyst to bypass the catalyst.

* * * * *

UNITED STATES PATENT AND TRADEMARK OFFICE
CERTIFICATE OF CORRECTION

PATENT NO. : 8,657,044 B2  
APPLICATION NO. : 12/679169  
DATED : February 25, 2014  
INVENTOR(S) : Dönitz et al.

Page 1 of 1

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 928 days.

Signed and Sealed this
Twenty-ninth Day of September, 2015

Michelle K. Lee
*Director of the United States Patent and Trademark Office*